Patented Sept. 15, 1925.

1,553,924

UNITED STATES PATENT OFFICE.

PAUL BERTHON, OF LYONS, FRANCE, ASSIGNOR TO LA SOCIÉTÉ DE STEARINERIE ET SAVONNERIE DE LYON, OF LYONS, FRANCE.

PROCESS FOR MANUFACTURING CELLULOSIC ESTERS.

No Drawing. Application filed September 29, 1922. Serial No. 591,426.

*To all whom it may concern:*

Be it known that I, PAUL BERTHON, a citizen of the French Republic, of Lyons, France, have invented a certain new or Improved Process for Manufacturing Cellulosic Esters, of which the following is a specification.

The present invention has for its object the preparation of cellulose esters from organic acids containing more than five atoms of carbon, in particular the higher fatty acids.

According to my invention I produce cellulose esters by directly condensing acid chlorides of the high fatty acids, that is to say acyclic organic acids containing more than five atoms of carbon with hydrocellulose, the reaction taking place with or without the presence of a diluent and more particularly in the presence or organic bases or condensing agents such as pyridine or quinoline.

The use of pyridine or quinoline is known also the manufacture of cellulose esters of acetic acid and its homologous acids by condensation is well known, whereas my method comprises the sole use of acid chlorides of the acyclic organic acids containing more than five atoms of carbon.

The esterification of the cellulose is effected by the direct action thereon of the acid chlorides of the aforesaid acids. The reaction arising from the mixture of the various components, which may be diluted in chloroform, tetrachloride of carbon, halogenous derivatives of acetylene, benzene, toluene, etc., if facilitated by the addition, of substances such as pyridine, quinoline or like organic bases. Reaction starts at normal temperature with a considerable discharge of heat and is completed by gradually raising the temperature.

According to the proportions of the chlorides employed, monoesters, diesters or triesters of cellulose are formed; but in all cases the hydrocellulose is integrally transformed. The diesters and triesters are, in general completely soluble in the aforesaid diluents and particularly in the benzenic carbides. This property allows them to be separated from the monoesters which are insoluble.

The cellulose esters of the organic acids referred to, appear in the majority of cases, in the form of fibres, granules or scales which are amorphous, inodorous, only slightly inflammable and are soluble in a large number of solvents and in particular chloroform, the halogenous derivatives of acetylene, tetrachloride of carbon and benzenic carbides.

Their solutions are clear and are extremely viscous and furnish by evaporation, even without addition of plasticizing substances, colourless and perfectly translucent pellicles.

These properties allow them to be employed, either alone or mixed with other cellulose esters, in the manufacture of various plastic materials, such as size, varnish fabrics, leather substances, photographic and cinematographic films.

The following example, given merely as illustration shows the process to be followed for the manufacture of a di-palmitate of cellulose.

100 grams of hydrocellulose are moistened with a mixture of 100 grams of chloroform and 200 grams of pyridine; a mixture of 500 grams of palmityl chloride and 300 grams of chloroform is added by degrees; the whole is heated for an hour in a boiling water bath, then for 2 hours in an autoclave heated to 100° C., while continually stirring the mass. The reaction being terminated, the mass is dissolved in an excess of chloroform and the cellulose ester is precipitated by adding alcohol; the product is washed, filtered, dried, etc.

The obtained di-palmitate of cellulose when dissolved in benzene yields, on evaporation of the solvent, a plastic colourless and translucent pellicle.

Claim.

A process for manufacturing cellulose esters consisting in mixing hydrocellulose with an acid chloride of the acyclic organic acids containing more than five atoms of carbon adding an organic base, heating the whole, precipitating the cellulose ester formed and washing and drying the latter.

In witness whereof I have signed this specification.

PAUL BERTHON.